(12) United States Patent
Fujita et al.

(10) Patent No.: US 7,296,812 B2
(45) Date of Patent: Nov. 20, 2007

(54) FRONT FORK OF A MOTOR CYCLE

(75) Inventors: Nobuaki Fujita, Shizuoka (JP);
Kimitoshi Satoh, Shizuoka (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/925,706

(22) Filed: Aug. 25, 2004

(65) Prior Publication Data

US 2005/0151343 A1     Jul. 14, 2005

(30) Foreign Application Priority Data

Jan. 14, 2004 (JP) .............................. 2004-007300

(51) Int. Cl.
*B62K 21/02* (2006.01)
(52) U.S. Cl. .................. 280/276; 267/64.15; 267/64.1; 267/6.64; 267/25; 267/64.22; 188/297
(58) Field of Classification Search ............. 267/64.15, 267/64.1, 6, 64.25, 64.22; 280/276; 188/297
See application file for complete search history.

(56) References Cited

U.S. PATENT DOCUMENTS

| 4,720,085 | A | * | 1/1988 | Shinbori et al. | ......... | 267/64.16 |
| 5,098,120 | A | * | 3/1992 | Hayashi et al. | ............. | 267/276 |
| 5,294,086 | A | * | 3/1994 | Fantini et al. | ............... | 248/631 |
| 5,449,188 | A | * | 9/1995 | Ohma | ......................... | 280/276 |
| 5,702,092 | A | * | 12/1997 | Farris et al. | ............. | 267/64.15 |
| 5,725,226 | A | * | 3/1998 | Cabrerizo-Pariente | ...... | 280/276 |
| 6,568,664 | B2 | * | 5/2003 | Furuya | ..................... | 267/64.26 |
| 6,739,609 | B2 | * | 5/2004 | Miyabe | ....................... | 280/276 |

| 2003/0001359 | A1 | * | 1/2003 | Miyabe | ....................... | 280/276 |
| 2005/0133320 | A1 | * | 6/2005 | Fujita et al. | ................. | 188/297 |
| 2005/0145456 | A1 | * | 7/2005 | Tomonaga et al. | .......... | 188/297 |

FOREIGN PATENT DOCUMENTS

| JP | SHO 60-157496 | * | 10/1985 |
| JP | 2002139089 A | * | 5/2002 |
| JP | 232395 | | 8/2003 |
| JP | 2003232395 A | * | 8/2003 |

OTHER PUBLICATIONS

Japanese Utility Model Application No. SHO 60-157496. Oct. 19, 1985.
JP 10061704, Jun. 3, 1998, Kanda Takeshi.
JP62125971, Jun. 8, 1987.

* cited by examiner

*Primary Examiner*—Lesley D. Morris
*Assistant Examiner*—Marlon Arce-Diaz
(74) *Attorney, Agent, or Firm*—Orum & Roth LLC

(57) ABSTRACT

In a front fork of a motorcycle or other motor vehicle, an oil chamber is provided in an outer side of a hollow pipe is vertically divided into upper and lower sides by a piston arranged in a leading end portion of the vehicle body side tube. An oil reservoir chamber communicated with the oil chamber is provided in an inner side of the hollow pipe. A partition member dividing the oil reservoir chamber into upper and lower sides is provided in an upper portion of the hollow pipe, and a compression side damping valve is provided in a flow path formed in the partition wall member. A seal member slidably contacted with an inner periphery of the vehicle body side tube is provided in an outer periphery of the vehicle body side tube is provided in an outer periphery of the partition wall member.

10 Claims, 6 Drawing Sheets

FRONT FORK OF A MOTOR CYCLE

BACKGROUND OF THE INVENTION

1. Field of the Invention

The present invention relates to a front fork of a motor cycle or the like.

2. Description of the Related Art

In conventional forks, as a front fork of a motor cycle or the like, there is a structure in which a vehicle body side tube is slidably inserted into an axle side tube. A hollow pipe is provided in a standing manner in a bottom portion of the axle side tube. An oil chamber provided in an outer side of the hollow pipe is divided into upper and lower sides by a piston provided in a leading end portion of the vehicle body side tube. An oil reservoir chamber communicating with the oil chamber is provided in an inner side of the hollow pipe. A partition wall member for dividing the oil reservoir chamber into upper and lower sides is provided in an upper portion of the hollow pipe. A flow path communicating the upper and lower oil reservoir chambers is formed in the partition wall member. A compression side damping valve is provided in the flow path, and a gas chamber in an upper portion of the oil reservoir chamber is provided in an inner portion of the vehicle body side tube, as described in Japanese Patent Application Laid-open No. 2003-232395 (patent document 1) and Japanese Patent Utility Model Application Laid-open No. 60-157496 (patent document 2).

In the front fork described in the patent document 1, the partition wall member is mounted on an upper portion of the hollow pipe, and the partition wall member is held in the upper portion of the hollow pipe by being pressed by a suspension spring installed in the vehicle body side tube.

In the front fork described in the patent document 2, the partition wall member (a valve case 11) provided in the upper portion of the hollow pipe (a seat pipe 4) comprises a main body portion provided with the compression side damping valve. A mounting portion connected to the main body portion, and a small-diameter protruding portion provided in the mounting portion is fitted and fixedly provided in the upper portion of the hollow pipe.

In accordance with the front fork described in the patent document 1, since the partition wall member is only mounted to the upper portion of the hollow pipe, the oil moving from the oil chamber in an outer side of the hollow pipe to the lower oil reservoir chamber in an inner side of the hollow pipe during a compression stroke leaks into the upper oil reservoir chamber through a contact surface between the partition wall member and the upper portion of the hollow pipe, and further through an annular gap between an outer periphery of the partition wall member and an inner periphery of the vehicle body side tube. Further, the partition wall member is shifted in a diametrical direction in the upper portion of the hollow pipe. The shape of the annular gap between the outer periphery of the partition wall member and the inner periphery of the vehicle body side tube fluctuates, so that a flow path coefficient is changed. Accordingly, a compression side damping force property is not stable.

In accordance with the front fork described in the patent document 2, since a small-diameter protruding portion in the mounting portion constituting the partition wall member is fitted to the inner periphery of the upper portion of the hollow pipe, it is possible to inhibit the partition wall member from being shifted in a diametrical direction, which is preferable. However, for this structure, a number of parts in the partition wall member, working man-hours and assembling man-hours are increased and cost is increased.

SUMMARY OF THE INVENTION

An object of the present invention is to achieve a stable compression side damping force property on the basis of a simple structure in a front fork of a motor vehicle or the like.

In accordance with the present invention, there is provided a front fork of a motor cycle or the like. A vehicle body side tube is slidably inserted into an axle side tube. A hollow pipe is provided in a standing manner in a bottom portion of the axle side tube. An oil chamber provided is in an outer side of the hollow pipe being vertically divided into upper and lower sides by a piston arranged in a leading end portion of the vehicle body side tube. An oil reservoir chamber communicates with said oil chamber being provided in an inner side of the hollow pipe. A partition member dividing said oil reservoir chamber into upper and lower sides rests on an upper portion of the hollow pipe. A flow path communicates the upper and lower oil reservoir chambers being formed in said partition wall member. A compression side damping valve is provided in said flow path. A gas chamber in an upper portion of said oil reservoir chamber is provided in an inner portion of the vehicle body side tube. A seal member slidably contacted with an inner periphery of the vehicle body side tube is provided in an outer periphery of said partition wall member.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 5A and 5B show a partition wall member, in which FIG. 5A is a plan view and FIG. 5B is a cross sectional view;

FIGS. 6A and 6B show a seal member, in which FIG. 6A is a plan view and FIG. 5B is a side view.

DESCRIPTION OF THE PREFERRED EMBODIMENTS

Embodiment 1-FIG. 1 to FIG. 6B

Figure 1:
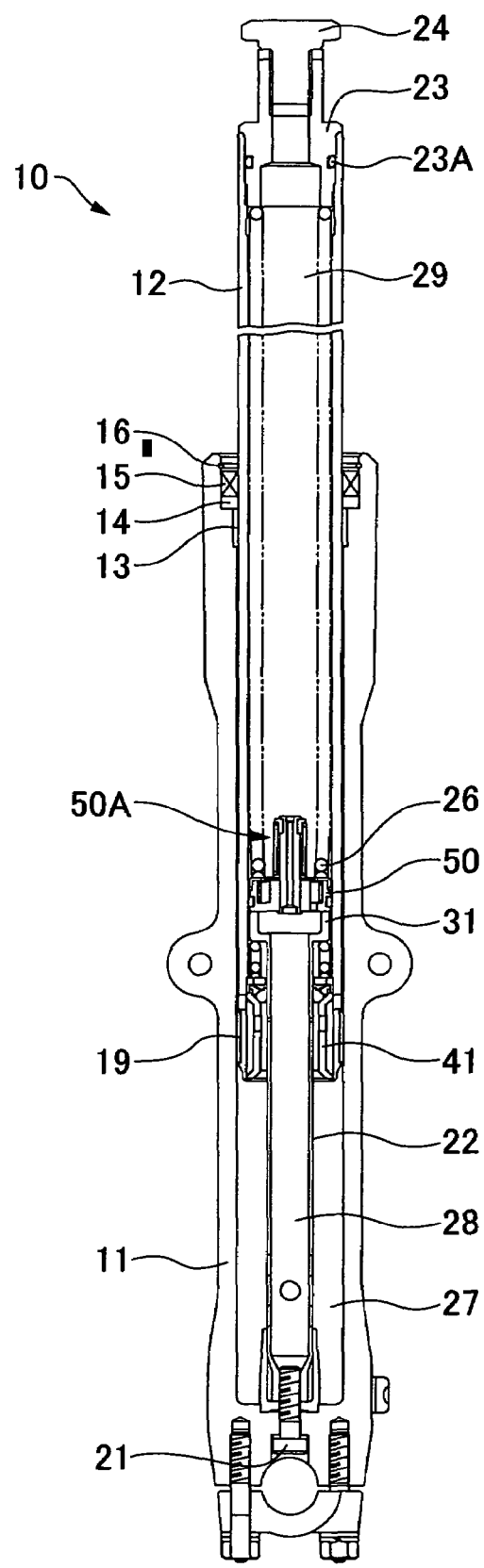
FIG. 1 is an entire cross sectional view showing a front fork in an expanded state in accordance with an embodiment 1.
Figure 2:
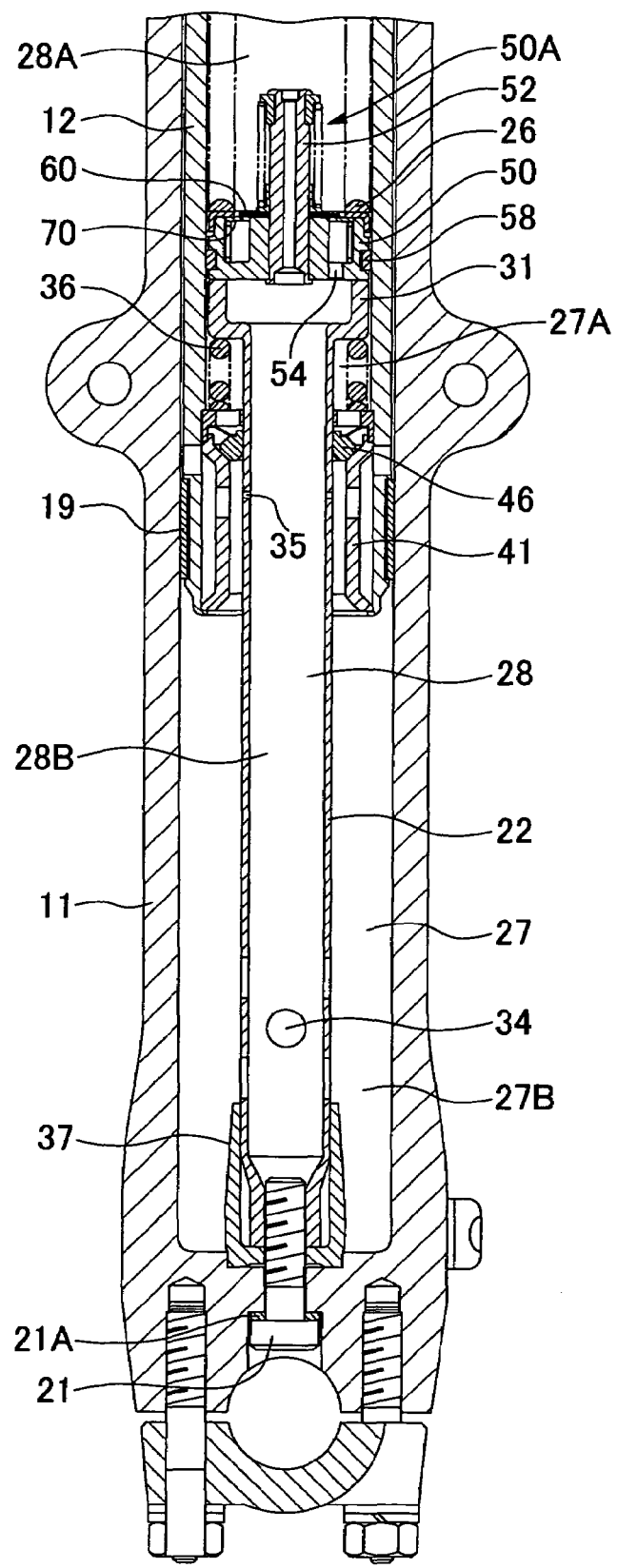
FIG. 2 is a cross sectional view of a lower portion in FIG. 1.
Figure 3:
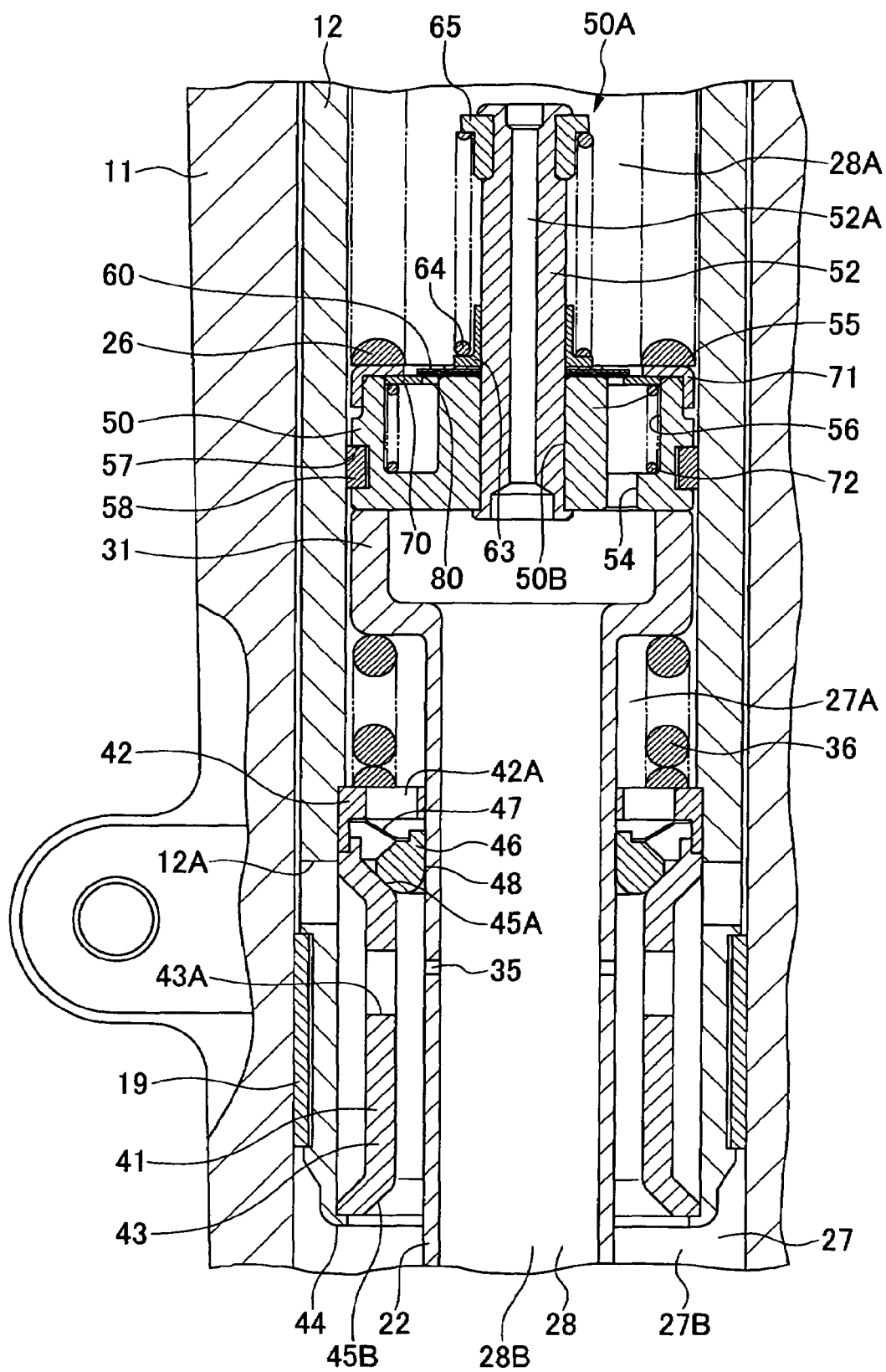
FIG. 3 is an enlarged view of a main portion in FIG. 2.
Figure 4:
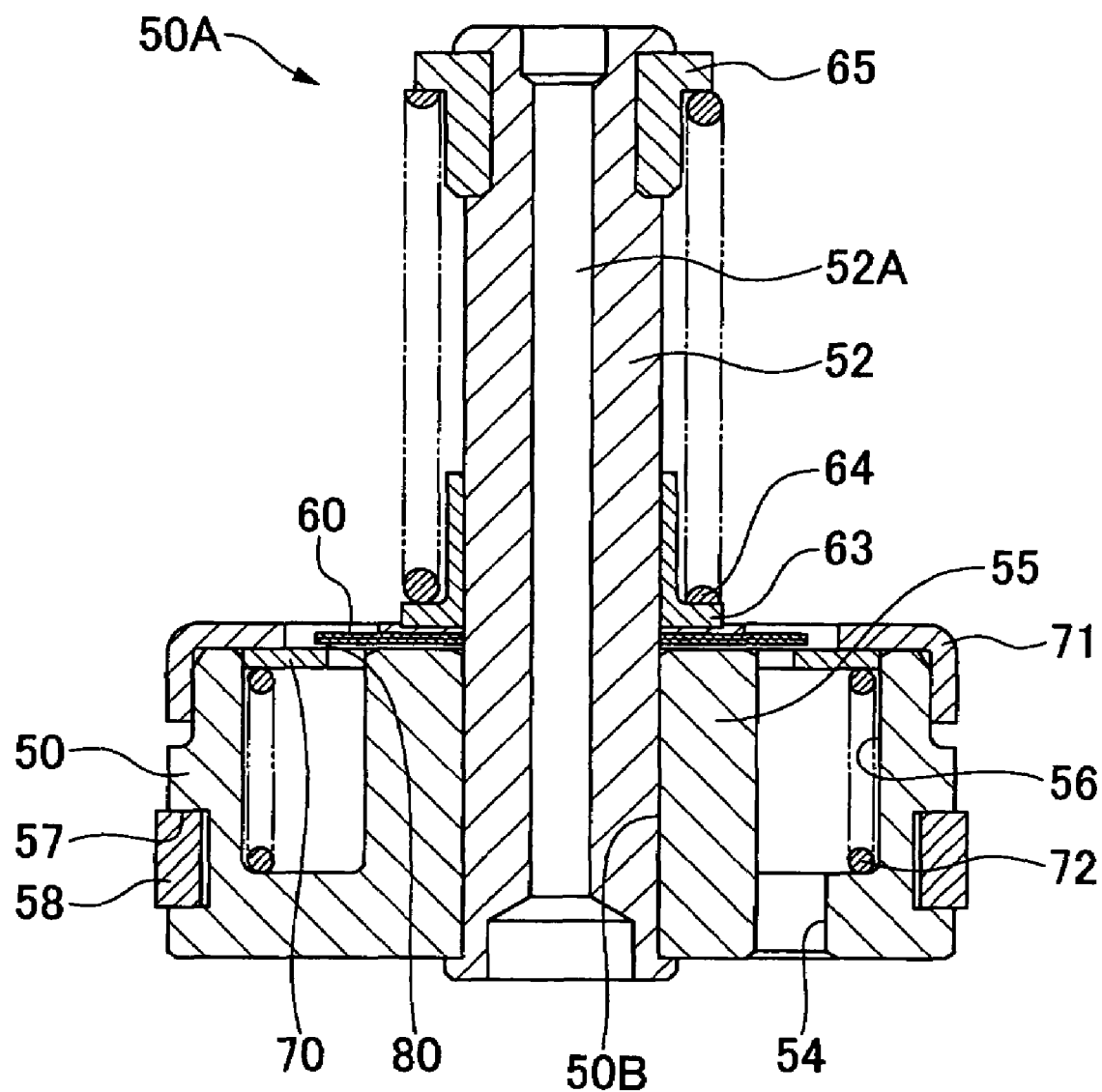
FIG. 4 is a cross sectional view showing a compression side valve unit.
Figure 5A:
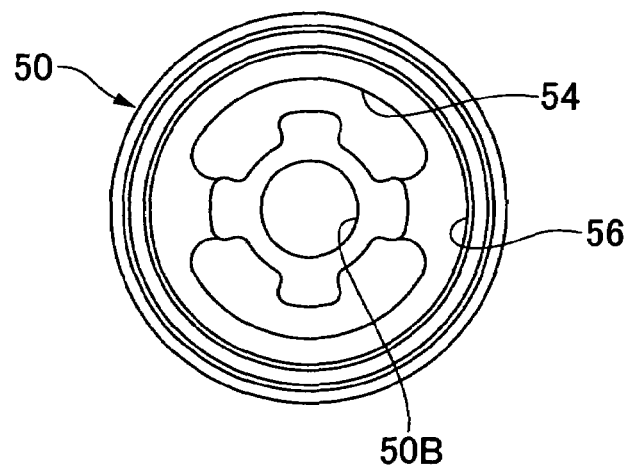
Figure 5B:
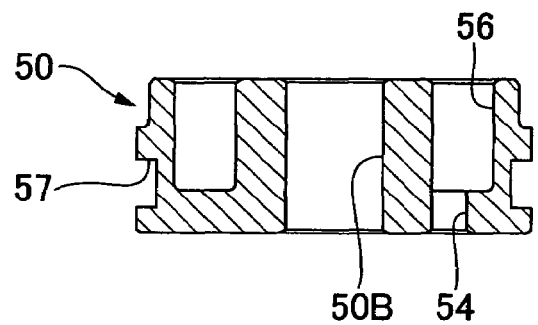

A front fork 10 is used in a two-wheeled motor vehicle or the like, and comprises, as shown in FIGS. 1 to 3, an inner tube 12 (vehicle body side tube) in a vehicle body side slidably inserted to an outer tube 11 (axle side tube) in which one end is closed and another end is opened. The outer tube 11 is provided in an axle side. A guide bush 13, a seal spacer 14, an oil seal 15 and a stopper ring 16 are provided in an opening end of the outer tube 11 to which the inner tube 12 is inserted. A guide bush 19 is provided in an outer peripheral portion of a lower end of the inner tube 12 inserted to the outer tube 11.

A bolt 21 is inserted to a bottom portion of the outer tube 11 via a copper packing 21A, and a hollow pipe 22 fixed by the bolt 21 is erected. A cap bolt 23 is screwed with an upper end portion of the inner tube 12 via an O-ring 23A. A suspension spring 26 is interposed between a partition wall member 50 provided in an upper end portion of the hollow pipe 22 in such a manner mentioned below, and the cap bolt 23. A plug bolt 24 is screwed into or onto the cap bolt 23.

The hollow pipe 22 is provided with an expanded portion 31 having an annular gap with respect to an inner periphery of the inner tube 12, in an upper end portion, and is provided with an oil chamber 27 in an outer side of a lower side portion of the expanded portion 31.

A piston 41 is provided in a lower end inner peripheral portion (a leading end portion) of the inner tube 12. The piston 41 comprises an annular upper piece 42 (a passage 42A) engaged with an inner diameter step portion of the inner tube 12, and a tubular lower piece 43 fixed to the upper piece 42 by a lower end caulking portion 44 of the inner tube 12. A check valve 46 is arranged in an inner periphery of an upper taper portion 45A of the lower piece 43. The check valve 46 is energized by a disc like spring 47, which may also be a coil spring, which is supported in a back surface by the upper piece 42. A taper surface of the check valve 46 is seated on a taper surface of the upper taper portion 45A, and an annular gap 48 is formed between an inner periphery thereof and an outer periphery of the hollow pipe 22.

The piston 41 sections the oil chamber 27 provided in an outer side of the hollow pipe 22 into upper and lower sides. In other words, an upper oil chamber 27A is formed by the inner tube 12, the hollow pipe 22, the expanded portion 31 and the piston 41. A lower oil chamber 27B is formed by the outer tube 11 in the lower portion of the piston 41 and the hollow pipe 22. An oil reservoir chamber 28 is provided in an inner side of the hollow pipe 22. The hollow pipe 22 is provided with a plurality of through holes 34 communicating the oil chamber 27 with the oil reservoir chamber 28 in a lower end side of the hollow pipe 22. The hollow pipe 22 is also provided with an orifice 35 communicating the oil chamber 27 with the oil reservoir chamber 28 in an upper end side of the hollow pipe 22. A working fluid is charged in the oil reservoir chamber 28, and a gas chamber 29 is provided in the interior of the inner tube 12 and in an upper portion of the oil reservoir chamber 28.

In one embodiment, a rebound spring 36 during maximum expansion is provided between the upper piece 42 of the piston 41 provided in the inner tube 12, and the expanded portion 31 provided in the hollow pipe 22. Thereby controlling the maximum expansion stroke. An oil lock piece 37 is held between a lower end portion of the hollow pipe 22 and a bottom portion of the outer tube 11. The maximum compression stroke is controlled by pressurizing the working fluid in a periphery of the oil lock piece 37 by a lower taper portion 45B of the lower piece 43 in the piston 41 during maximum compression.

Further, a hole 43A is provided in a lower piece 43 of the piston 41. A hole 12A is provided in a portion of the inner tube 12 provided with the piston 41. The working fluid in the oil chamber 27 is supplied to the guide bush 13 of the outer tube 11, the guide bush 19 of the inner tube 12, and a space between the tubes held by the guide bushes 13 and 19. Thereby lubricating the guide bushes 13 and 19 and compensating a volume of the space between the tubes.

Accordingly, the front fork 10 is provided with a partition wall member 50 (FIGS. 5A and 5B) constituting a compression side valve unit 50A (FIG. 4) in an upper portion of the hollow pipe 22. The partition wall member 50 is mounted to an upper end surface of the expanded portion 31 in the hollow pipe 22, and is held while being pinched with respect to the upper end surface of the expanded portion 31 by the suspension spring 26 mentioned above. The partition wall member 50 sections the oil reservoir chamber 28 mentioned above into upper and lower sides. A valve guide 52 is provided having a center hole 52A communicating an upper oil reservoir chamber 28A with a lower oil reservoir chamber 28B so as to be fixed to an inserting and attaching hole 50B. The partition wall member 50 is provided with an expansion and compression common flow passage 54 communicating the upper and lower oil reservoir chambers 28A and 28B in a periphery of the center hole 52A.

The expansion and compression common flow passage 54 formed in the partition wall member 50 is provided with an annular deflection valve 60 corresponding to a compression side damper valve, when being supported in an inner periphery, and an annular check valve 70 when supported in an outer periphery. An outer periphery of the deflection valve 60 and an inner periphery of the check valve 70 are partially overlapped so as to position the deflection valve 60 in a side of the upper oil reservoir chamber 28A.

The deflection valve 60 corresponding to a laminated body of a plurality of sheet valves is mounted on an upper end surface of a deflection valve front surface side supporting portion 55 around the inserting and attaching hole 50B of the valve guide 52 in the partition wall member 50 via a thin shim 62 (not shown) having an outer diameter larger than an inner peripheral diameter of the expansion and compression common flow passage 54. A first spring 64 is provided in a back surface of the deflection valve 60, in a side of the upper oil reservoir chamber 28A, via a spring receiver 63 having a diameter smaller than the deflection valve 60. In this case, the first spring 64 is supported by a back surface to a spring receiver 65 fixed to an upper end portion of the valve guide 52 in accordance with a caulking process. An inner periphery of the deflection valve 60 is provided in an outer periphery of the valve guide 52 in such a manner as to freely move in an axial direction. The first spring 64 holds the inner peripheral portion of the deflection valve 60 with respect to the partition wall member 50 so as to support in a back surface. The deflection valve 60 is opened when the working fluid in the lower oil reservoir chamber 28B reaches a fixed flow speed.

A guide hole 56 which can receive the check valve 70 is provided in an upper end portion in an outer peripheral side of the expansion and compression common flow passage 54 in the partition wall member 50. An outer periphery of the check valve 70 is slidably fitted to the guide hole 56 so as to freely slide in an axial direction. A valve stopper 71 is fixed to an opening portion of the guide hole 56. A second spring 72 is provided on a back surface of the check valve 70, in a side of the lower oil reservoir chamber 28B. The second spring 72 is received in the interior of the guide hole 56 of the partition wall member 50, and holds an outer peripheral portion of the check valve 70 with respect to the valve stopper 71 so as to support a back surface.

A small gap 80 is provided in the overlapping portion between the deflection valve 60 and the check valve 70. In accordance with the present embodiment, the small gap 80 is provided owing to an existence of the shim 62 mentioned above. The size of the small gap 80 can be changed by adjusting a thickness of the shim 62.

Figure 6A:
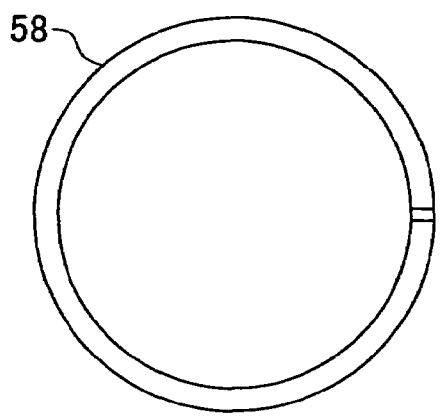
Figure 6B:

Accordingly, an annular groove 57 is provided in an outer periphery of the partition wall member 50, and a seal member 58 (FIGS. 6A and 6B) is fitted to the annular groove 57. The seal member 58 comprises a C-shaped piston ring having a skewed slit at one position in a peripheral direction, as shown in FIGS. 6A and 6B, and is slidably contacted with an inner periphery of the inner tube 12. At this time, an upper end surface of the expanded portion 31 of the hollow pipe 22 and a lower end surface of the partition wall member 50 which are in contact with each other both form a flat surface.

The seal member 58 of the partition wall member 50 is assembled and held in a state of being press inserted to the inner periphery of the inner tube 12 with a fixed fastening margin. The partition wall member 50 is prevented from being pushed up from the expanded portion 31 of the hollow pipe 22 so as to be offset therefrom, when the pressure of the upper oil chamber 27A in the outer side of the hollow pipe 22 ascends during the expansion stroke in the manner mentioned below. In other words, the fastening margin of the seal member 58 is set such that the sum of the spring force of the suspension spring 26 and the friction force of the seal member 58 with respect to the inner periphery of the inner tube 12 is more than the pushing up force obtained by the maximum hydraulic pressure of the upper oil chamber 27A during the expansion stroke applied to the pressure receiving surface of the seal member 58 through the annular gap between the inner periphery of the inner tube 12 and the outer periphery of the expanded portion 31 of the hollow pipe 22.

In the front fork 10, an impact applied to the vehicle is absorbed and reduced by the suspension spring 26 and the air spring in the gas chamber 29. A vibration of the suspension spring 26 generated by absorbing the impact is controlled by the following damping effect.

Compression Stroke

In a compression stroke of the front fork 10, the inner tube 12 descends from an expanded state in FIG. 1 so as to increase pressure in the lower oil chamber 27B. The check valve 46 of the piston 41 moves in an upper direction so as to be opened, whereby the oil in the lower oil chamber 27B is replaced by oil from the upper oil chamber 27A. The oil, in an amount determined by multiplying cross sectional area of the inner tube 12 by a stroke, moves from the lower oil chamber 27B to the lower oil reservoir chamber 28B through the through hole 34. When the oil moving to the lower oil reservoir chamber 28B moves to the upper oil reservoir chamber 28A, a damping force is generated based on the center hole 52A of the partition wall member 50, the small gap 80 between the deflection valve 60 of the expansion and compression common flow passage 54 and the check valve 70, and the deflection of the deflection valve 60.

In other words, when the piston speed of the front fork 10 is low, a damping force is generated caused by a passage resistance of the center hole 52A and the small gap 80 when the oil in the lower oil reservoir chamber 28B moves to the upper oil reservoir chamber 28A via the center hole 52A of the partition wall member 50, and the small gap 80 of the expansion and compression flow passage 54. The magnitude of the damping force can be changed based on a diameter of the center hole 52A and the size of the small gap 80.

When the piston speed of the front fork 10 is moderate, the deflection valve 60 is opened in accordance with a deflecting deformation based on a deflection property. A damping force is generated caused by the passage resistance of the oil which moves from the lower oil reservoir chamber 28B to the upper oil reservoir chamber 28A through the opening flow passage of the deflection valve 60. The magnitude of the damping force can be changed in accordance with a thickness and a diameter of the deflection valve 60.

When the piston speed of the front fork 10 is high, the deflection valve 60 is slid in accordance with the deflection of the first spring 64 supporting the deflection valve 60 in the back surface so as to open to a relatively large extent. The passage resistance applied to the oil which moves from the lower oil reservoir chamber 28B to the upper oil reservoir chamber 28A is reduced. The magnitude of the damping force can be changed based on the spring constant and the set load of the first spring 64. Accordingly, the front fork 10 undergoes a large stroke, and a vibration absorbing property is improved.

Expansion Stroke In an expansion stroke of the front fork 10, the inner tube 12 ascends from a compressed state so as to increase pressure in the upper oil chamber 27A. A damping force is generated caused by a passage resistance generated in the annular gap 48 when the oil I the upper oil chamber 27A moves from the annular gap 48 of the check valve 46 seated on the upper taper portion 45A of the piston 41 to the lower oil chamber 27B and a passage resistance generated in the orifice 35 when the oil in the upper oil chamber 27A comes out of the orifice 35 in the hollow pipe 22 and moves to the lower oil chamber 27B via the lower oil reservoir chamber 28B and the through hole 34 of the hollow pipe 22.

In this expansion stroke, oil in an amount determined by multiplying cross sectional areas of the inner tube 12 by the stroke is resupplied from the upper oil reservoir chamber 28A to the lower oil chamber 27B via the lower oil reservoir chamber 28B. At this time, the oil in the upper oil reservoir chamber 28A passes through the center hole 52A of the partition wall member 50, and moves to the lower oil reservoir chamber 28B while opening the check valve 70.

In accordance with the present embodiment, the following operations and effects can be achieved.

(a) The seal member 58 provided in the outer periphery of the partition wall member 50 prevents oil from leaking from the lower oil reservoir chamber 28B in the inner side of the hollow pipe 22 through the contact surface between the partition wall member 50 and the upper portion of the hollow pipe 22, and further the annular gap between the outer periphery of the partition wall member 50 and the inner periphery of the inner tube 12. As a result, loss of working oil caused by the generation of the compression side damping force is reduced, and the compression side damping force property is stable.

(b) The seal member 58 provided in the outer periphery of the partition wall member 50 is brought into contact with the inner periphery of the inner tube 12, and inhibits the partition wall member 50 from being displaced in the diametrical direction. As a result, it is possible to prevent the shape of the annular gap between the outer periphery of the partition wall member 50 and the inner periphery of the inner tube 12 from fluctuating due to displacement of the partition wall member 50 in the diametrical direction in the upper portion of the hollow pipe 22. The compression side damping force property is resulting stable.

(c) It is not necessary that the seal member is provided in the upper portion of the hollow pipe 22.

(d) Since the seal member 58 provided in the outer periphery of the partition wall member 50 inhibits the partition wall member 50 from being displaced in the diametrical direction, it is not necessary that the positioning protruding portion is provided in the end surface of the partition wall member 50 which is in contact with the upper portion of the hollow pipe 22. It is possible to form the end surface of the partition wall member 50 in a flat surface. It is possible to make the working shape of the partition wall member 50 simple. It is also possible to reduce the working cost.

Figure 7:
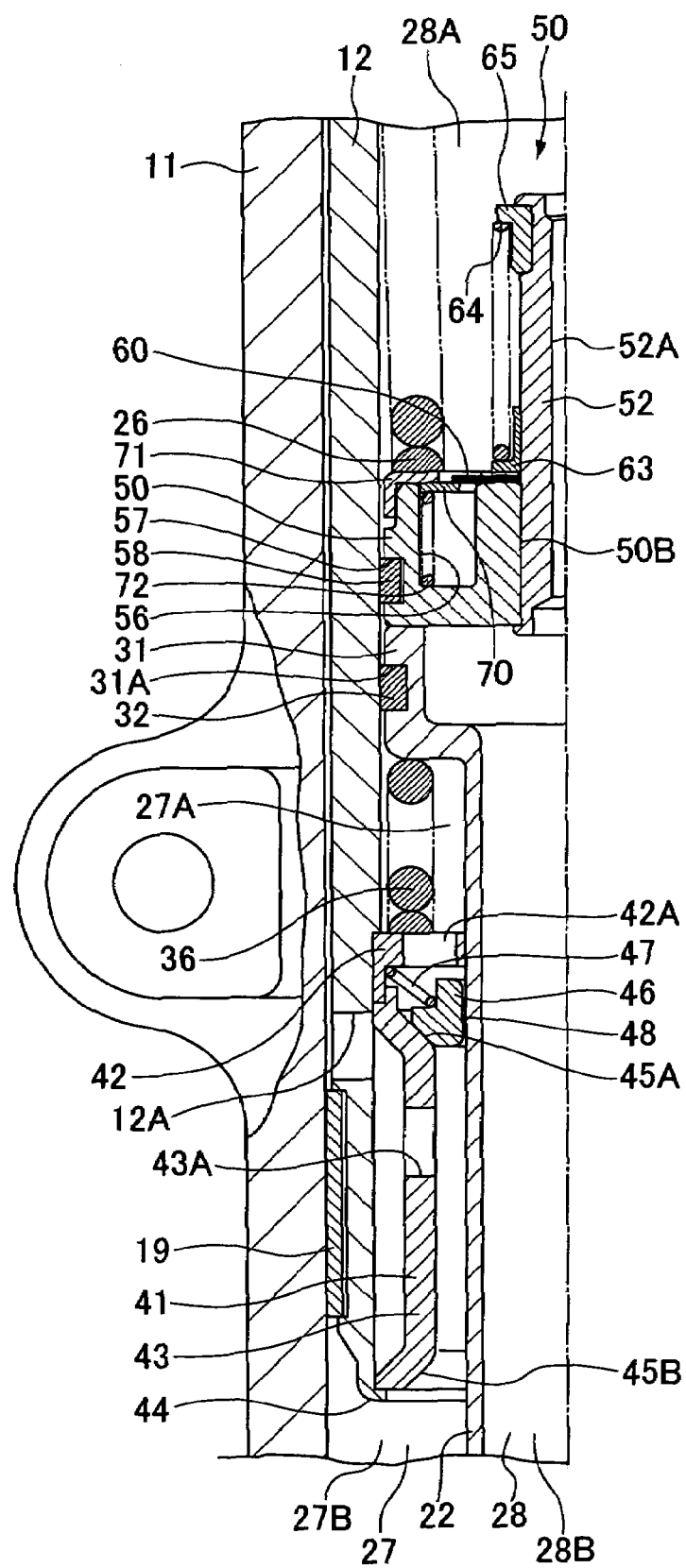
FIG. 7 is a half cross sectional view of a main portion of a front fork in accordance with an embodiment 2.

Embodiment 2-FIG. 7

An embodiment 2 is substantially different from the embodiment 1 in that an annular groove 31A is provided in an outer periphery of the expanded portion 31 in the upper portion of the hollow pipe 22. The seal member 32 is fitted to the annular groove 31A. The seal member 32 comprises a piston ring, and is slidably contacted with the inner periphery of the inner tube 12.

In accordance with the embodiment 2, the following operations and effects can be achieved in addition to the operations and effects (a), (b) and (d) in the embodiment 1. When the pressure of the upper oil chamber 27A in the outer side of the hollow pipe 22 is increased during the expansion stroke. The seal member 32 provided in the upper portion of the hollow pipe 22 block off the increased pressure oil being applied to the side of the partition wall member 50. Accordingly, the partition wall member 50 can be stably arranged in the upper portion of the hollow pipe 22 without setting the fastening margin of the seal member 58 provided in the partition wall member 50 with respect to the inner periphery of the inner tube 12 too tight. The partition wall member 50 and the seal member 58 can be easily assembled in the inner periphery of the inner tube 12.

(1) Effects of Claim 1
(a) Since a partition wall member is not provided by screwing, but it is just disposed at or placed on an upper portion of the hollow pipe the partition wall member can be easily or quickly removed from the upper portion of the hollow pipe so that a compression side damping valve provided in the partition wall member can be maintained.
(b) Because the partition wall member is just disposed at or placed on an upper portion of the hollow pipe the oil in the lower portion of the partition wall member might leak into the upper portion of the partition wall member, via the placing portion of the partition wall member through the outer periphery of the partition wall member, However, a seal member provided in an outer periphery of said partition wall member prevents said leakage so as to stabilize the compression side damping force.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as being limited to the specific embodiment set out above, but should be understood to include all possible embodiments which can be encompassed within a scope of equivalents thereof with respect to the features set out in the appended claims.

What is claimed is:

1. A front fork of a motor vehicle comprising:
a vehicle body side tube slidably inserted into an axle side tube;
a hollow pipe provided in a standing manner in a bottom portion of the axle side tube;
an oil chamber provided in an outer side of the hollow pipe being vertically divided into upper and lower sides by a piston arranged in a leading end portion of the vehicle body side tube, and an oil reservoir chamber communicated with said oil chamber being provided in an inner side of the hollow pipe;
a partition wall member dividing said oil reservoir chamber into upper and lower sides rests on but is not joined to or integral with an upper portion of the hollow pipe, a flow path communicating the upper and lower oil reservoir chambers being formed in said partition wall member, and a compression side damping valve provided in said flow path; and
a gas chamber in an upper portion of said oil reservoir chamber provided in an inner portion of the vehicle body side tube,
a seal member slidably contacted with an inner periphery of the vehicle body side tube is provided in an outer periphery of said partition wall member,
wherein said seal member prevents oil from leaking from the lower oil reservoir chamber.

2. A front fork of a motor vehicle as claimed in claim 1, wherein an annular groove is provided in an outer periphery of said partition wall member, and said seal member is fitted to said annular groove.

3. A front fork of a motor vehicle as claimed in claim 1, wherein said seal member comprises a C-shaped piston ring having a skewed slit at one position in a peripheral direction.

4. A front fork of a motor vehicle as claimed in claim 2, wherein said seal member comprises a C-shaped piston ring having a skewed slit at one position in a peripheral direction.

5. A front fork of a motor vehicle as claimed in claim 1, wherein the seal member slidably contacted with the inner periphery of the vehicle body side tube is also provided in an upper portion of said hollow pipe.

6. A front fork of a motor vehicle as claimed in claim 5, wherein an expanded portion is provided in the upper portion of said hollow pipe,and said seal member is fitted to an annular groove provided in said expanded portion.

7. A front fork of a motor vehicle as claimed in claim 6, wherein said seal member comprises a piston ring.

8. A front fork of a motor vehicle as claimed in claim 1, wherein an end surface of the partition wall member contacted with the upper portion of said hollow pipe is formed in a flat surface.

9. A front fork of a motor vehicle as claimed in claim 2, wherein an end surface of the partition wall member contacted with the upper portion of said hollow pipe is formed in a flat surface.

10. A front fork of a motor vehicle as claimed in claim 6, wherein an upper end surface of the expanded portion of said hollow pipe and an end surface of the partition wall member contacted with the upper portion of said hollow pipe are both formed in a flat surface.

* * * * *